Nov. 24, 1931.  R. A. BUCKNER  1,833,823
COFFEE MAKER
Filed Dec. 12, 1930
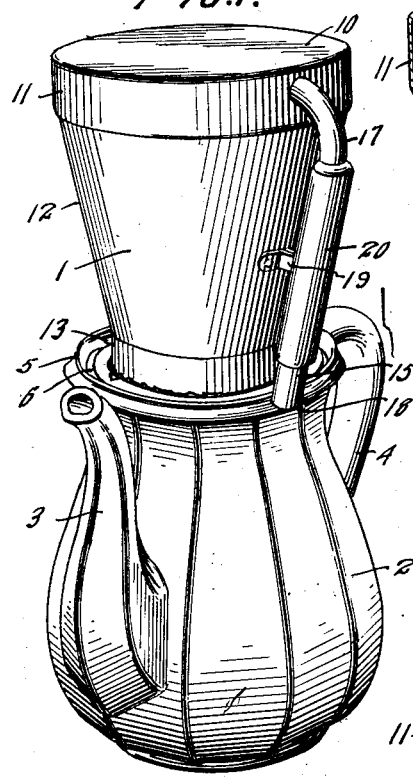
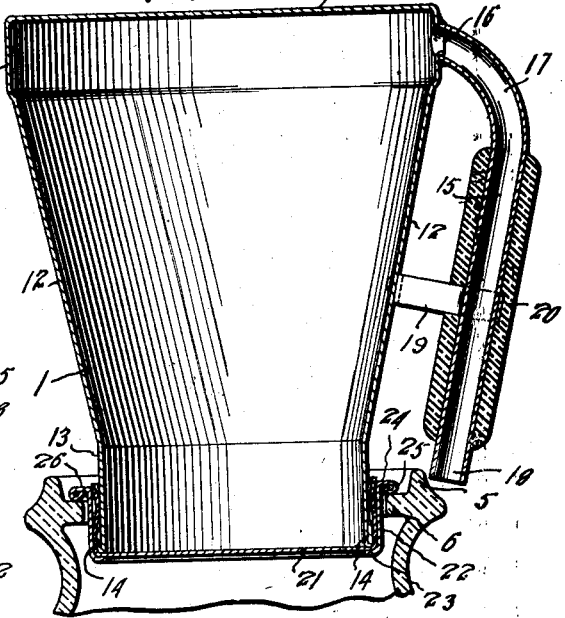
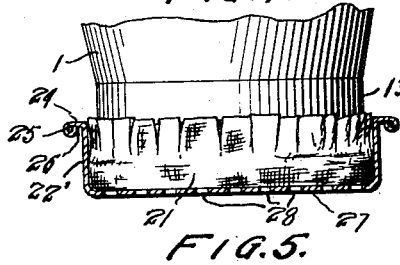
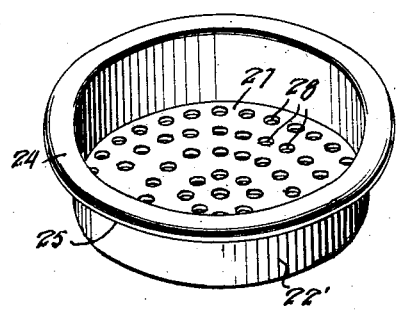
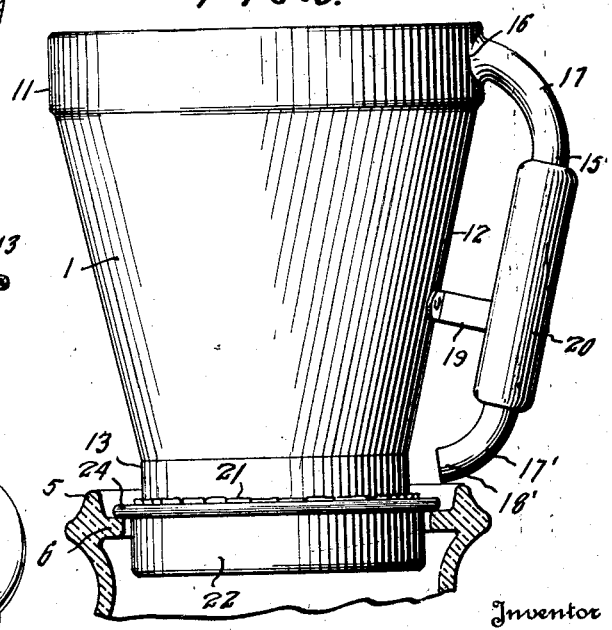
Inventor
ROYLE A. BUCKNER
By Semmes & Semmes
Attorney Patented Nov. 24, 1931

1,833,823

UNITED STATES PATENT OFFICE

ROYLE A. BUCKNER, OF NEVADA, MISSOURI

COFFEE MAKER

Application filed December 12, 1930. Serial No. 501,954.

This invention relates in general to coffee makers, and more particularly has reference to a structure forming an improvement over that described in my Patent No. 899,099, dated September 2, 1908.

In my coffee maker described in the above mentioned patent there have developed a number of difficulties. The first of these difficulties is due to the fact that this structure was made up of a plurality of parts soldered or otherwise fastened together. By virtue of the manner in which it was formed, there were left, especially around the juncture between the bottom and the sloping sides of the coffee maker, deep corners or crevices which tended to collect the gum from the coffee, and in time to create a very unsanitary condition within the coffee maker. This has been so pronounced that after a short period of use it has become necessary to thoroughly cleanse the coffee maker by means of some very strong cleansing agent to remove the collected gum or to entirely discard the coffee maker and secure a new one. The sharp corners on the exterior of the bottom of this device also prohibited its being placed, either temporarily or otherwise, upon any surface which might easily be marred.

Another difficulty which has arisen in connection with this feature is the frequency with which the soldered joints have melted apart and necessitated repairs or replacements. The inconvenience and inefficiency resulting from this difficulty have formed a serious menace to the utility of the coffee maker as formerly disclosed.

Another difficulty which has arisen in connection with my former coffee maker has been that encountered in lifting the coffee maker for the purpose of inverting it into the coffee pot or other receiving vessel. In utilizing the vent pipe for a handle as suggested in my patent, it has been necessary to use cloths or some form of insulating holder in order to prevent burning of the hands. Due to the difficulty of grasping the vent pipe with such an insulating holder, frequent accidents have occurred resulting in more or less serious burns to the hands or other parts of the body of the person engaged in making the coffee.

Still another difficulty which has arisen in connection with the former structure is that the filter cloth which was clamped over the top of the coffee maker before inverting the same has shown a tendency to be pulled out by the weight of the coffee and water in the coffee maker and to sag downwardly into the vessel receiving the coffee during the process of seepage. This difficulty has at times gone to the extent that one edge of the filter cloth has entirely been pulled out from between the neck or top of the coffee maker and the ring which was adapted to clamp the same in position.

Difficulty has also been experienced in connection with the flange on this ring which was adapted to support the coffee maker in its inverted position. The coffee would at times leak or seep through the filter cloth between the ring and the neck of the coffee maker and collect on top of the outwardly extending flange. When the coffee maker was then removed from the top of the receiving vessel and restored to its upright position this coffee which has so seeped through would run down the sides of the coffee maker and drip upon the table or other support. This was not only true of the coffee which seeped through between the ring and the neck of the coffee maker but in addition coffee from the outer surface of the filter cloth would run down the outside of the ring and drip over the outer edge of the outwardly extending flange onto the sloping sides of the coffee maker or on the table.

One other difficulty which was experienced lay in the fact that during the process of draining the coffee from the coffee maker into the receiving vessel a certain amount of steam would pass into the vent pipe and become condensed therein. This condensate would then run down inside the vent pipe until it reached the open end, at which point it would drip upon the outside of the receiving vessel or upon the table or other support upon which the apparatus rested.

An object of the present invention is to overcome the above and other difficulties in connection with my former patented device and the prior art.

Another object of this invention is to form a coffee maker retaining all the advantages of my prior device while eliminating the disadvantages of the same.

Yet another object of this invention is to form a coffee maker of one piece of metal having rounded corners which will not become filled with gum or other refuse and a smooth flat bottom which will not mar any surface upon which it might be placed.

Yet another object of my invention is to provide a means upon the neck of a coffee maker which will tend to enable a filter cloth stretched thereover to be more tightly clamped thereto.

Yet another object of this invention is to provide a clamping means for such a filter cloth which will not only clamp the filter cloth to the neck of the coffee maker, but which will in addition positively support said filter cloth at substantially all points thereof upon which stress is to be placed.

Another object of this invention is to provide a vent pipe similar to that utilized in my former device and to so shape said vent pipe that it will conduct any condensate forming therein into the top of the vessel which is to receive the finished coffee.

Yet another object of this invention is to provide an insulating section upon the vent pipe so that the vent pipe may be more readily used in a handle for the coffee maker without danger of burning the hands.

With the above and other objects in view my invention consists essentially of a coffee maker as described in the following specification and as disclosed in the accompanying drawings.

In order to insure an adequate comprehension of my invention and to make certain that the same may be fully understood, I have illustrated one embodiment thereof in the accompanying drawings in which:

Figure 1 is a perspective view of my improved coffee maker resting in its inverted position upon the top of a coffee receiving urn.

Figure 2 is a view in section of the coffee maker shown in Figure 1 with a portion of the coffee urn omitted therefrom.

Figure 3 is a view of my coffee maker illustrating a modified form of the vent pipe shown in Figure 2.

Figure 4 is a sectional view of a modified form of retaining ring for my filter cloth, illustrated in place upon the neck of the coffee maker.

Figure 5 is a perspective view of the form of retaining ring illustrated in Figure 4.

Referring now more specifically to the drawings, and particularly to Figure 1 thereof, there is shown a coffee maker 1 of my improved form in its inverted position upon the top of the coffee receiving urn 2. This receiving urn is illustrated as having the conventional spout 3 and the handle 4. This urn is provided with an upstanding rim 5 within which there is formed a circumferentially extending shoulder 6. This shoulder 6 is adapted to perform the dual function of supporting the cap or cover for the coffee urn during the time when coffee is not being made and of supporting the coffee maker during the time in which coffee is being made.

The coffee maker 1 which has been illustrated more clearly in Figure 2 is shown as having a flat bottom 10, with a short cylindrical section 11 joined immediately thereto. This cylindrical section 11 merges into a truncated conical section 12 which extends nearly to the top of the coffee maker. This section 12 then merges into a second and smaller cylindrical section 13, which at its upper end is folded or bent outwardly upon itself as shown at 14 to form a bead or enlarged portion against which the filter cloth 21, to be hereinafter described, may be more firmly clamped.

Adjacent the bottom 10 of the coffee maker there is formed an opening 16 in the wall of the cylindrical section 11 above mentioned. Communicating with the interior of the coffee maker through this opening there is joined to the walls of the coffee maker a vent pipe 15 in the manner illustrated in Figure 2. This pipe 15 is bent upwardly as at 17 so that it extends along the side of the truncated conical section 12 in substantially parallel relation thereto. This pipe is terminated at a point 18 adjacent the top of the coffee maker. A bracing or bracket member 19 is provided as shown in Figures 1, 2 and 3 at a point intermediate the ends of the pipe 15 and rigidly connects the same to the wall 12 of the truncated conical portion of the coffee maker. For a considerable portion of its length this pipe 15 is encased in an insulating material 20 suitable for a handle in order to enable the pipe to be used in handling the coffee maker and inverting the same into the top of the urn 2. This insulating material may be of any of the many well known and suitable compositions now in use.

In Figure 3 there is shown a modification of the vent pipe as at 15′. In this modification the vent pipe is joined as above described to the main body of the coffee maker as at 16 and is bent upwardly at 17. It is likewise provided with a handle portion of insulating material 20 and with a supporting bracket 19. However, the free end of this pipe is bent inwardly toward the neck of the coffee maker as at 17′ so that the open end of the pipe is located at 18′. By virtue of this disposition of the end of the pipe 15′ any condensate or other liquid escaping therefrom may be deposited directly within the top flange 5 of the receiving coffee urn 2.

In Figures 1 to 4 there is illustrated a filter cloth 21 which is stretched over the open end of the cylindrical portion 13 of the coffee maker 1. Over the top of this filter cloth there is then placed a retaining ring 22 of cylindrical form for the purpose of clamping the cloth firmly against the bead 14 which has been described as being formed on the open end of the cylindrical part 13. This ring 22 is formed with an inwardly turned flange 23 which bears directly against the filter cloth and serves to prevent the ring from being forced too far on to the neck or cylindrical part 13 of the coffee maker. At the other edge of the ring there is provided an outwardly extending flange 24 the outer edge of which is rolled toward the body of the ring and away from the body of the coffee maker to form a bead 25. As will be noted from the various figures of the drawings this bead 25 in connection with the main part of the ring 22 forms a circumferential channel of small extent as shown at 26. This channel serves to catch any liquid which may run over the outer part of the ring when the coffee maker is restored to its upright position after having been inverted. It is also noted that the flange 24 is small enough in extent to fit entirely within the rim 5 of the urn and rest upon the shoulder 6.

In Figures 4 and 5 there is illustrated a modified form of retaining ring 22' in which the flange 23 is omitted and in which an end portion 27 is formed extending over the entire open end of the coffee maker for the purpose of positively preventing the filter cloth from being bulged or forced outwardly by the weight of the coffee thereon. This end portion 27 is formed with perforations 28 for the purpose of allowing the coffee to filter through the filter cloth and be deposited in the coffee urn. This modified ring 22' is formed with an outwardly extending flange 24 rolled as at 25 to form a channel 26 in substantially the same manner as was illustrated and described in connection with the form shown in Figure 2.

In view of the foregoing detailed description the operation of my invention will be at once apparent to a person skilled in the art. The coffee is first placed within the coffee maker 1 and a suitable amount of boiling water is added thereto after which it is allowed to simmer for a short time. The filter cloth 21 is then placed over the top of the coffee maker and is clamped thereon by means of either the retaining ring 22 or the ring 22'. The coffee maker is then inverted, by means of the handle portion 20, into the top of the urn 2 as illustrated in Figures 1, 2, and 3. After allowing the coffee sufficient time in which to filter through the filter cloth and be deposited into the urn 2, the coffee maker is removed from the top of the coffee urn in a manner similar to that in which it was placed thereon. In removing the coffee maker it is noted that any liquid which might run from the wet surface of the filter cloth down the outside of the retaining ring would be caught within the circumferential channel 26 formed by the bead 25. It is further noted that during the time which the coffee maker remains inverted into the top of the urn 2, any seepage which may occur along the filter cloth between the cylindrical portion 13 and the retaining ring, will emerge upon the upper portion of the outwardly extending shoulder 24. Since, however, this shoulder 24 does not have any obstruction at its outer edge which would prevent such liquid from flowing off, the liquid would immediately flow over the outer edge of the flange 24 and be deposited within the rim 5 of the coffee urn upon the shoulder 6. When the coffee maker is then removed from the top of the urn this liquid would be allowed to flow directly into the urn. During the time which the coffee maker remains inverted into the top of the urn any condensate which may be formed within the vent pipe 15', if this form is used, will be conducted by the pipe as shown in Figure 3 directly into the top of the urn and be deposited between the edge of the shoulder 24 and the rim 5 upon the shoulder 6.

From the foregoing it will be appreciated that I have provided a coffee maker which retains the advantage of the sloping wall of my former coffee maker, while at the same time affording by virtue of its construction, a larger capacity. By making this coffee maker in one piece I have also eliminated the possibility of soldered joints becoming loose and have eliminated deep corners and crevices which formely served to collect coffee gum and other refuse and to render the condition of the coffee maker unsanitary after a short period of use.

It will further be appreciated that I have provided a means whereby the vent pipe illustrated in connection with my former coffee maker may be used as a handle without danger of burning the hands.

It will further be apreciated that I have provided a novel form of vent pipe in which any condensate collecting therein will be deposited within the receiving vessel and will not be allowed to drip upon the table or other support.

It will be seen moreover that I have provided upon the outer portion of the neck of my improved coffee maker a means whereby the filter cloth may be more firmly clamped to the neck and more firmly retained in its clamped position.

I have also provided a retaining ring for clamping said filter cloth in its operative position, and have formed upon this ring an outwardly extending shoulder which will fit within the rim of the urn to support the coffee maker, and which will serve to prevent any liquid from being allowed to run down the face of the coffee maker when it is restored to its upright position.

It will be noted also that I have provided a modified form of a clamping ring which has a portion extending over the operative surface of the filter cloth to prevent the same from being bulged outwardly by the weight of the materials within the coffee maker.

While I have illustrated and described certain embodiments of my invention, I wish it to be clearly understood that these forms are by way of illustration only and are not to be construed as in any way limiting my invention. It is understood that the scope of this invention is to be limited only by the prior art and by the terms of the appended claim.

I claim:

A coffee maker comprising, in combination, an urn for receiving the finished beverage, a circular shoulder formed inside the rim of the urn, a receptacle formed as a truncated cone merged at its top and bottom into integral cylindrical parts adapted to be inverted with its mouth within the top of said urn and supported on said shoulder, a filter fitting over the mouth of said receptacle, a cylindrical member tightly fitting about the mouth of said receptacle and clamping the filter in place, the edge of said cylindrical member nearest the body of the receptacle being bent outwardly to form a radially extending flange and said flange having a small portion of its outer edge rolled back upon itself in a direction away from the body of the receptacle, the finished flange being of such extent as to fit within the top of the urn and rest upon the circular shoulder and having a shallow channel on the side remote from the body of the receptacle, a pipe communicating with the interior of said receptacle near its bottom to vent liquid in said receptacle when inverted, said pipe extending upwardly along the outside wall of said receptacle in spaced relation thereto to a point near the top of the receptacle, the upper end of said pipe being bent inwardly to allow any condensate forming, to be deposited within the mouth of the urn and insulating means surrounding a portion of the pipe to afford protection when using the pipe as a handle.

In testimony whereof I affix my signature.

ROYLE A. BUCKNER.